US010774716B2

(12) United States Patent
De Smet et al.

(10) Patent No.: US 10,774,716 B2
(45) Date of Patent: Sep. 15, 2020

(54) METHODS AND SYSTEMS FOR EXHAUST GAS RECIRCULATION

(71) Applicant: Ford Global Technologies, LLC, Dearborn, MI (US)

(72) Inventors: Frederik De Smet, Genk (BE); Monika Angst, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/240,622

(22) Filed: Jan. 4, 2019

(65) Prior Publication Data
US 2019/0211728 A1   Jul. 11, 2019

(30) Foreign Application Priority Data
Jan. 11, 2018 (DE) .................. 10 2018 200 369

(51) Int. Cl.
*F01N 9/00* (2006.01)
*F01N 3/20* (2006.01)
*F01N 3/08* (2006.01)
*F02M 26/00* (2016.01)

(52) U.S. Cl.
CPC .......... *F01N 3/208* (2013.01); *F01N 3/0814* (2013.01); *F01N 3/0842* (2013.01); *F01N 3/2066* (2013.01); *F01N 9/00* (2013.01); *F02M 26/00* (2016.02); *F01N 2430/00* (2013.01); *F01N 2560/026* (2013.01); *F01N 2570/14* (2013.01); *F01N 2610/02* (2013.01); *F01N 2900/1402* (2013.01)

(58) Field of Classification Search
CPC ...... F02M 26/05; F02M 26/06; F01N 3/2066; F01N 3/208; F01N 3/2086; F01N 2610/02
See application file for complete search history.

(56) References Cited

U.S. PATENT DOCUMENTS

| 7,493,762 | B2 | 2/2009 | Barge et al. |
| 8,042,527 | B2 | 10/2011 | Styles et al. |
| 8,108,129 | B2 | 1/2012 | Nakayama et al. |
| 8,596,114 | B2 | 12/2013 | Nam |
| 2014/0360163 | A1 | 12/2014 | Kurtz et al. |
| 2016/0251012 | A1* | 9/2016 | Schneider ............. B60W 20/16 701/22 |

(Continued)

FOREIGN PATENT DOCUMENTS

| DE | 102014210448 A1 | 12/2014 |
| DE | 102014018037 A1 | 6/2015 |

(Continued)

OTHER PUBLICATIONS

Buenaventura, F. et al., "Air Fraction and EGR Proportion Control for Dual Loop EGR Diesel Engines," Ingenieria y Universidad, vol. 19, No. 1, Jun. 2015, 16 pages.

*Primary Examiner* — Jonathan R Matthias
(74) *Attorney, Agent, or Firm* — Geoffrey Brumbaugh; McCoy Russell LLP

(57) ABSTRACT

Methods and systems are provided for HP-EGR and LP-EGR. In one example, a method includes selecting a HP-EGR mode or a LP-EGR mode in response to a first difference calculated between ammonia desired during the two modes, and a second difference calculated between $NO_x$ emitted during the two modes.

20 Claims, 6 Drawing Sheets

(56) References Cited

U.S. PATENT DOCUMENTS

2017/0122168 A1* 5/2017 Angst .................... F02M 26/06
2017/0175607 A1    6/2017 De Smet et al.
2018/0187583 A1* 7/2018 De Smet ................ F01N 3/035

FOREIGN PATENT DOCUMENTS

| EP | 3006686 A1 | 4/2016 |
|---|---|---|
| JP | 2012052510 A | 3/2012 |
| WO | 2014192846 A1 | 12/2014 |

* cited by examiner

METHODS AND SYSTEMS FOR EXHAUST GAS RECIRCULATION

CROSS REFERENCE TO RELATED APPLICATION

This application claims priority to German Patent Application No. 102018200369.6, filed Jan. 11, 2018. The entire contents of the above-referenced application are hereby incorporated by reference in their entirety for all purposes.

FIELD

The present description relates generally to adjusting exhaust gas recirculation in response to ammonia and NOx concentrations.

BACKGROUND/SUMMARY

The reduction of nitric oxide emissions when operating diesel internal combustion engines may be a primary focus when trying to decrease emissions. One strategy in this case may be to recirculate exhaust gas from the exhaust gas tract into the internal combustion engine. For this purpose, a high pressure exhaust gas recirculating system (HP-EGR) may be used in which an exhaust gas recirculating line branches off from the exhaust gas tract directly downstream of the internal combustion engine and fluidly couples to the intake tract. Alternatively, or in combination with the high pressure exhaust gas recirculating system, a low pressure exhaust gas recirculating system (LP-EGR) may be used in which an exhaust gas recirculating line branches off from the exhaust gas tract downstream of a turbine and/or from one or multiple exhaust gas treatment systems. Low pressure exhaust gas recirculating systems have the advantage that the exhaust gas may be cleaned (e.g., filtered) and arrives cooler in the intake tract than in the case of a HP-EGR and therefore the intake air is cooler and consequently recirculates a larger quantity of LP-EGR. In comparison to using only a high pressure exhaust gas recirculating system, a low pressure exhaust gas recirculating system holds a greater potential for reducing the nitric oxide ($NO_x$) emission of the internal combustion engine. The two exhaust gas recirculating systems are efficient in different areas of the engine rotation hold characteristic curve with the result that the use and throughput of the exhaust gas recirculating systems may be controlled in dependence upon prevailing parameters. The provision of the two systems also offers the advantage that, in the case of a degradation in one system, the other system may be used as a substitute.

Exhaust gas treatment devices may arranged in the exhaust gas tract so as to clean and/or filter the exhaust gas, the treatment devices may include one or more of nitric oxide absorption catalytic converters (lean NOx traps, LNT), particulate filters, and catalytic converters for selective catalytic reduction (SCR). The one or multiple SCR devices may be used to reduce nitric oxides present in the exhaust gas. Ammonia may be used as a reducing agent, said ammonia being introduced into the exhaust gas tract upstream of an SCR device in the form of an aqueous urea solution, for example AdBlue®, which may commercially available.

SCR devices may be arranged upstream and downstream of the branch of a low pressure exhaust gas line. If an SCR device is arranged upstream, ammonia that escapes from the SCR may be conveyed into the LP-EGR line and successively into the internal combustion engine. This may be undesirable since the combustion of ammonia may produce additional quantities of nitric oxides. Consequently, additional reducing agents are then desired that in turn may escape from the SCR as a result of slip.

A first SCR device that is arranged upstream of the branch of the low pressure exhaust gas recirculating line is located nearer to the internal combustion engine and is therefore exposed to higher exhaust gas temperatures than a second SCR device that is arranged further downstream. The first SCR may therefore exposed to a more intense thermal aging process. The ammonia absorption capacity of the first SCR may decrease as the SCR ages; which may contribute to the further increase in the quantity of recirculated ammonia.

The greater the quantity of ammonia being recirculated via the low pressure exhaust gas recirculating line to the internal combustion engine and combusted therein, the greater the quantity of reducing agent introduced into the exhaust gas tract in order to reduce the increased quantities of nitric oxide. In this case one inefficient point may be reached in which the use of the high pressure exhaust gas recirculating line may appear more efficient in comparison with the low pressure exhaust gas recirculating line. Thus, a strategy for the exhaust gas recirculation during the operation of the internal combustion engine compensating for ammonia is desired.

A first aspect of the disclosure relates to a method for controlling recirculated exhaust gas in an arrangement of an internal combustion engine having an exhaust gas tract, wherein at least one first SCR and also at least one first device for introducing ammonia into the exhaust gas tract are arranged upstream of the first SCR, and also at least one high pressure exhaust gas recirculating line branches off upstream of the first SCR and at least one low pressure exhaust gas recirculating line branches off downstream of the first SCR, the arrangement furthermore comprising a control device, and wherein exhaust gas is guided in a controlled via an algorithm through the low pressure exhaust gas recirculating line and/or high pressure exhaust gas recirculating line in dependence upon the quantity of ammonia desired and the magnitude of the nitric oxide emission, said method comprising operating the internal combustion engine when recirculating exhaust gas through the low pressure exhaust gas recirculating line or the high pressure exhaust gas recirculating line, determining a difference value for the quantity of ammonia desired by the first SCR between using the high pressure exhaust gas recirculating line (HP mode) and using the low pressure exhaust gas recirculating line (LP mode), determining a difference value for the magnitude of the nitric oxide emission between an HP mode and an LP mode, making a decision with regard to switching between HP mode and LP mode in dependence upon the determined difference values with regard to the quantity of ammonia desired and the magnitude of the nitric oxide emission, wherein the mode is selected that is characterized by virtue of a lower quantity of ammonia desired and a lower magnitude of nitric oxide emission.

The method in accordance with the disclosure may include finding the optimal exhaust gas recirculating strategy in which the magnitude of the nitric oxide emission to the environment may be kept as low as possible whilst consuming as little as possible of the reducing agent that is introduced. The method is therefore cost-effective and beneficial to the environment.

The difference values are determined in this case between the integrals of the values that are determined for high pressure exhaust gas recirculating operation and low pressure exhaust gas recirculating operation with regard to the quantity of ammonia desired or the magnitude of the nitric oxide emission. In this case, the values for the high pressure exhaust gas recirculating operation and low pressure exhaust gas recirculating operation respectively are calculated both under the condition that the low pressure exhaust gas recirculating system (low pressure mode) is currently being used as well as under the condition that the high pressure exhaust gas recirculating system (high pressure mode) is currently being used. At least one or multiple nitric oxide sensors may be arranged in the exhaust gas tract.

In one example, the issues described above may be addressed by a method comprising determining a first difference between a quantity of ammonia desired by an SCR device during a LP-EGR mode and a HP-EGR mode, determining a second difference between an amount of nitric oxide emission during the LP-EGR mode and the HP-EGR mode, and selecting one of the LP-EGR mode and the HP-EGR mode based on a comparison of the first and second differences. In this way, efficiency may be increased and reductant consumption may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
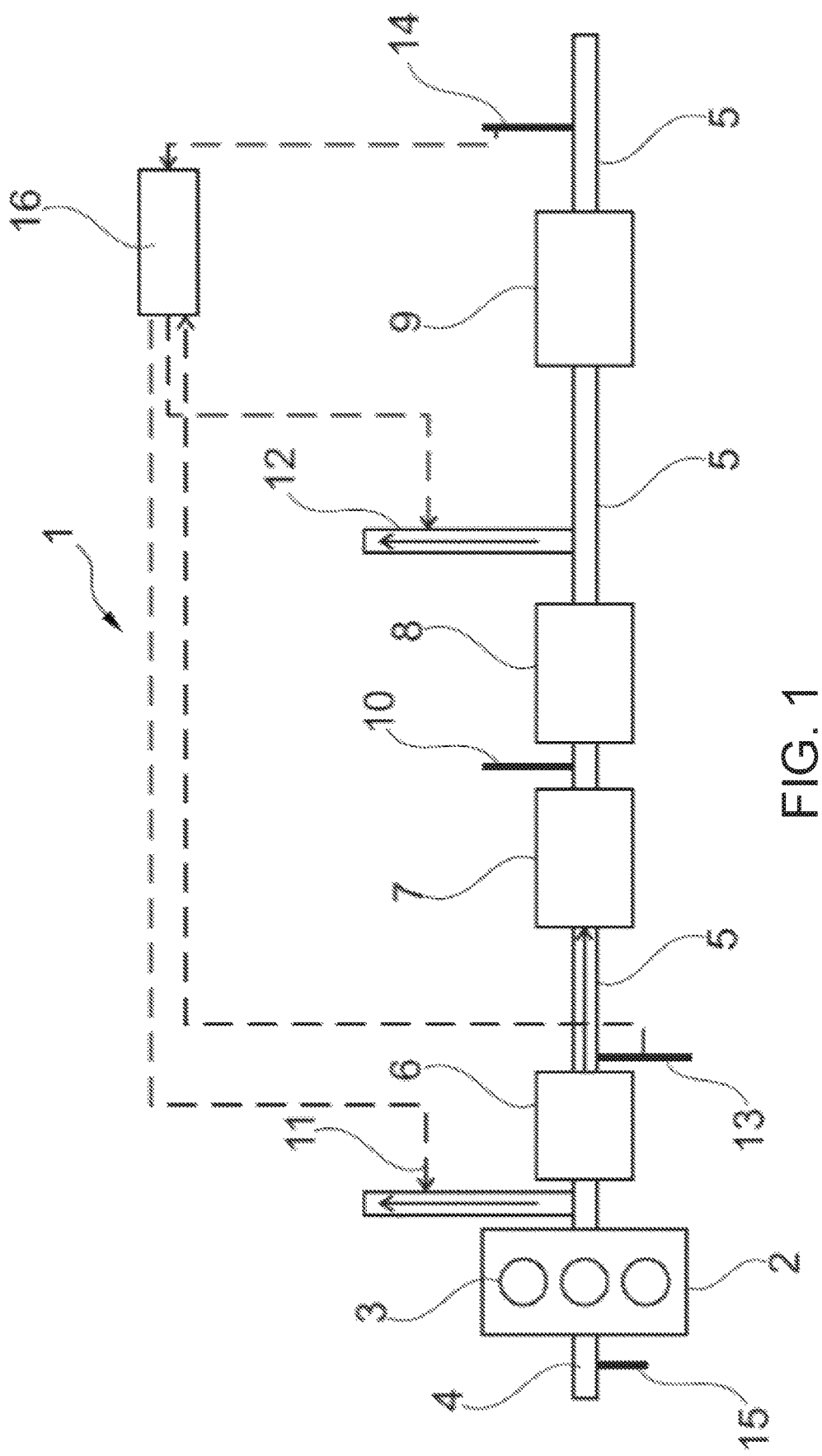
FIG. 1 illustrates an arrangement of an internal combustion engine having an exhaust gas tract for implementing the method in accordance with the disclosure.

The following description relates to systems and methods for switching between HP-EGR and LP-EGR in response to amount of ammonia desired and $NO_x$ emissions. Schematics of an internal combustion engine are shown in FIGS. 1 and 3. Methods for adjusting EGR operation of the engine are shown in FIGS. 2, 4, 5A, and 5B. In one example, methods may include switching between LP-EGR and HP-EGR based on a calculated efficiency. During a plurality of engine operating conditions, LP-EGR may be desired to decrease $NO_x$ emissions relative to HP-EGR due to lower combustion temperatures. However, during some conditions where ammonia from one or more SCR devices and/or a reductant injector is recirculated with the LP-EGR to an engine, LP-EGR may become less efficient than HP-EGR to operate. For example, the recirculated ammonia may be converted to $NO_x$ (e.g., nitric oxides) during combustion, wherein the increase in $NO_x$ may result in a higher amount of ammonia desired during the LP-EGR mode to reduce the $NO_x$. As such, if the ammonia demand and/or $NO_x$ production during the LP-EGR mode becomes too high, it may be desired to operate in the HP-EGR mode to decrease ammonia consumption.

The "and/or" wording in relation to the use of the mentioned exhaust gas recirculating lines the control of guiding the exhaust gas through the low pressure exhaust gas recirculating line and/or high pressure exhaust gas recirculating line in dependence upon the quantity of ammonia required and the magnitude of the nitric oxide emission is therefore used because the method is in fact particularly intended for use respectively only on one of the mentioned exhaust gas recirculating lines but embodiments of the invention are also possible in which the two lines may be used simultaneously.

It is preferred that in the low pressure mode the quantity of ammonia desired for the low pressure exhaust gas recirculating operation is determined using sensor-based values with regard to the quantity of nitric oxide $CNOx\_FG\_sen$ present in the exhaust gas that is directly emitted by the internal combustion engine using the following formula:

$$CNH3\_LP = CNOx\_FG\_sen - CNOx\_NOxrec\_est + CNH3\_rec\_est \quad \text{(formula 1)}$$

In this case, $CNH3\_LP$ is the ammonia concentration desired in the low pressure mode under the assumption that the entire quantity of nitric oxide would be converted and that there would not be any ammonia slip into the exhaust. $CNOx\_NOxrec\_est$ is the calculated quantity of nitric oxides present in the exhaust gas that is directly emitted by the internal combustion engine, said quantity being increased as a result of the recirculation of nitric oxides that are present in the exhaust gas but not removed via the first SCR. $CNH3\_rec\_est$ is the calculated quantity of ammonia being recirculated through the LP-EGR. All the calculated concentrations of ammonia are related in this case to the exhaust gas tract upstream of the first SCR.

In other words, $CNOx\_NOxrec\_est$ is in this case the quantity of nitric oxides by which the nitric oxide quantity in the exhaust gas is increased, which relates to the nitric oxides present in the recirculated exhaust gas. This quantity may be calculated via an SCR-based model which may include knowledge of the exhaust gas recirculating rate and the ratio of the quantity of nitric oxide being emitted by the internal combustion engine with respect to the quantity of nitric oxide (that may be approximately 1) being conveyed into the internal combustion engine. Although this quantity increases the sensor value $CNOx\_FG\_sen$, it does not however have an increasing effect on the quantity of ammonia desired because it is once again emitted by the internal combustion engine and does not lead to an increase in the quantity of ammonia desired.

$CNH3\_rec\_est$ may be calculated via an SCR-based model and which may include knowledge of the exhaust gas recirculating rate. The quantity of recirculated ammonia as a reducing agent for a second, optional SCR that is arranged downstream of the branch of the low pressure exhaust gas recirculating line is lost and for which may be compensated.

Alternatively, the quantity of ammonia desired in the low pressure exhaust gas recirculating operation may also be determined without a sensor measurement on the basis of model-based nitric oxide values. It is therefore likewise preferred if, in the low pressure mode in the case of model-based values with respect to the quantity of nitric oxides $CNOx\_FG\_base$ present in the exhaust gas that is directly emitted by the internal combustion engine, the quantity of ammonia desired is determined using the following formula:

$$CNH3\_LP = CNOx\_FG\_base + CNOx\_NH3rec\_est + CNH3\_rec\_est \quad \text{(formula 2)}$$

CNOx_FG_base is based on the condition that neither nitric oxide nor ammonia are recirculated. CNOx_NH3rec_est is the quantity of nitric oxide increased via the ammonia combustion. CNH3_rec_est has been described above.

In the case of the terms of the formula, the initials FG stand for feed gas (exhaust gas that is directly emitted by the internal combustion engine), rec stands for recirculated, sen stands for sensor, base stands for basal and est stands for estimated (calculated, modelled).

Furthermore, in the low pressure mode the theoretical quantity of ammonia desired in the high pressure exhaust gas recirculating operation is determined using model-based values with regard to the quantity of nitric oxides CNOx_FG_est present in the exhaust gas that is directly emitted by the internal combustion engine using the following formula:

$$CNH3\_HP = CNOx\_FG\_est \quad \text{(formula 3)}$$

In this case, the quantity of ammonia desired for the high pressure operation may only be determined in a model-based manner since exhaust gas is recirculated in the low pressure mode. The quantity of ammonia that is desired may be substantially identical to the quantity of nitric oxide that is emitted by the internal combustion engine (under the assumption of a 100% reduction in nitric oxide). Furthermore, in the low pressure mode the potential quantity of nitric oxides that is emitted by the internal combustion engine in the high pressure mode may be calculated using a model for nitric oxide emission. Typically, this calculation depends upon the proportion of the combusted gas mass in the intake tract (fman). In this case, it is necessary to allocate this fman to corresponding modes since said fman is different in the high pressure mode and in the low pressure mode.

If the exhaust gas in the high pressure mode is recirculated, the quantity of ammonia desired for the high pressure recirculating operation may be determined using sensor-based values with regard to the quantity of nitric oxides CNOx_FG_sen present in the exhaust gas that is directly emitted by the internal combustion engine using the following formula:

$$CNH3\_HP = CNOx\_FG\_sen \quad \text{(formula 4)}$$

The quantity of ammonia desired may be equivalent to the measured nitric oxide concentration.

In the high pressure mode, the quantity of ammonia desired for the high pressure recirculating operation is likewise preferably determined using model-based values with regard to the quantity of nitric oxides CNOx_FG_est present in the exhaust gas that is directly emitted by the internal combustion engine using formula 3 above.

Furthermore, when recirculating exhaust gas through the high pressure exhaust gas recirculating line the theoretical quantity of ammonia desired in the low pressure exhaust gas recirculating operation is determined using model-based values with regard to the quantity of nitric oxides CNOx_FG_mod present in the exhaust gas that is directly emitted by the internal combustion engine using the formula 2 above.

In this case the quantity of ammonia desired may be determined in a model-based manner. CNOx_FG_base corresponds in this case to the quantity of nitric oxides that directly escapes from the internal combustion engine under the condition that nitric oxide and ammonia are not recirculated. In this case, the calculation is based on the proportion of the combusted gas mass in the intake tract (fman) that has been accordingly allocated since fman is different respectively in the high pressure mode and low pressure mode.

It is preferred that the difference values with regard to the quantity of ammonia desired between the integrals of the values or the filtered variables with regard to the quantity of ammonia desired in the low pressure exhaust gas recirculating operation mNH3_LP and in the high pressure exhaust gas recirculating operation mNH3_HP are determined over a specific time interval. The difference corresponds in other words to an integrated mass flow over a specific time interval. In the case of:

$$m\text{NH3\_LP} - m\text{NH3\_HP} > 0;$$

the quantity of ammonia desired for the high pressure exhaust gas recirculating operation is lower than for the low pressure exhaust gas recirculating operation. In other words, in this case, less reducing agent is to be supplied when recirculating exhaust gas in the high pressure exhaust gas recirculating operation than in the low pressure exhaust gas recirculating operation.

In the case of $$m\text{NH3\_LP} - m\text{NH3\_HP} < 0;$$

the quantity of ammonia desired for the low pressure exhaust gas recirculating operation is lower than in the high pressure exhaust gas recirculating operation. In other words, in this case, less reducing agent is to be supplied when recirculating exhaust gas in the low pressure exhaust gas recirculating operation than in the high pressure exhaust gas recirculating operation.

In a similar manner to the quantity of ammonia desired, the magnitude of the nitric oxide emission to the environment may also be determined on the basis of sensor values as well as in a model-based manner. In the low pressure mode, the magnitude of the nitric oxide emission to the environment for the low pressure exhaust gas recirculating operation is preferably determined on the basis of sensor-based values with regard to the quantity of nitric oxides CNOx_FG_sen present in the exhaust gas that is directly emitted by the internal combustion engine. Likewise, the magnitude of the nitric oxide emission to the environment for the low pressure exhaust gas recirculating operation is preferably determined using model-based values with regard to the quantity of nitric oxides CNOx_FG_base present in the exhaust gas that is directly emitted by the internal combustion engine.

Furthermore, in the low pressure mode the magnitude of the nitric oxide emission to the environment for the high pressure exhaust gas recirculating operation may be determined in a model-based manner under the assumption that exhaust gas would be recirculated through the high pressure exhaust gas recirculating line. In this case, the magnitude of the nitric oxide emission that is determined is calculated using models (SCR models) that take into account that nitric oxides and ammonia escape from the catalytic converters. The actual ammonia load of the SCR is used for the calculations particularly with regard to the high pressure exhaust gas recirculating line.

The theoretical magnitude of the nitric oxide emission in the exhaust region is determined in a model-based manner in the high pressure mode for the low pressure exhaust gas recirculating operation under the assumption that exhaust gas would be recirculated through the low pressure exhaust gas recirculating line. The theoretical magnitude of the nitric oxide emission in the exhaust region is determined for the high pressure exhaust recirculating operation in the high pressure mode preferably on the basis of sensor-based values with regard to the quantity of nitric oxides CNOx_F-G_sen present in the exhaust gas that is directly emitted by the internal combustion engine or on the basis of model-based values with regard to the quantity of nitric oxides CNOx_FG_est present in the exhaust gas that is directly emitted by the internal combustion engine.

The difference values with regard to the magnitude of the nitric oxide emission may be determined from the values that are integrated over a time interval with regard to the magnitude of the nitric oxide emission for the low pressure exhaust gas recirculating operation mNOx_LP and for the high pressure exhaust gas recirculating operation mNOx_HP, wherein in the case of:

$$mNOx\_LP - mNOx\_HP > 0;$$

the magnitude of the nitric oxide emission is lower for the high pressure exhaust gas recirculating circuit than for the low pressure exhaust gas recirculating circuit, and in the case of:

$$mNOx\_LP - mNOx\_HP < 0;$$

the magnitude of the nitric oxide emission for the low pressure exhaust gas recirculating circuit is lower than for the high pressure exhaust gas recirculating circuit.

In summary, using the above calculations it is possible to decide whether to use the high pressure exhaust gas recirculating system or the low pressure exhaust gas recirculating system. In this case, this decision may be described as a function of the quantity of ammonia desired and the magnitude of the nitric oxide emission:

$$f(mNOx\_LP - mNOx\_HP, mNH3\_LP - mNH3\_HP).$$

The mode is therefore determined as a function of the difference values with regard to the quantity of ammonia desired and with regard to the magnitude of the nitric oxide emission to the environment. In the case of conflicting values (for example the quantity of ammonia desired for the low pressure mode, the magnitude of the nitric oxide emission for the high pressure mode), the mode that is altogether more advantageous is selected as a compromise. This may be based on a magnitude of the difference, as will be described below.

The described calculations may still be further refined. In this case, values may also be calculated for a mixed mode in which low pressure exhaust gas recirculation and high pressure exhaust gas recirculation are used simultaneously. The rates of exhaust gas that is guided through high pressure exhaust gas recirculating lines and low pressure exhaust gas recirculating lines may be continuously varied in this case in dependence upon the prevailing conditions. Furthermore, the decision as to which exhaust gas recirculating system is to be used may depend directly on sensor values with regard to the nitric oxide concentration, said values being measured downstream of the internal combustion engine, in lieu of using SCR-based models. In this case, in the case of identical nitric oxide values with regard to the two modes, the high pressure mode is to be preferred because as a consequence a lower flow rate into the SCR is produced, in other words a more efficient conversion of nitric oxides is produced owing to lower flow rates. Furthermore, the calculations may be further supplemented in that values that are calculated with regard to the nitric oxide slip and ammonia slip are absorbed into the theoretical quantity of ammonia desired.

A second aspect of the disclosure relates to a motor vehicle having a control device that is embodied so as to control a method in accordance with the disclosure. The advantages of the motor vehicle in accordance with the disclosure correspond to the advantages of the method in accordance with the disclosure.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows an arrangement 1 comprising an internal combustion engine 2. The internal combustion engine 2 may comprise three cylinders 3 in the illustrated example, however, other numbers and arrangements of cylinders may be used in the internal combustion engine 2 without departing from the scope of the present disclosure. An intake tract 4 leads to the internal combustion engine 2 so as to supply charging air. An exhaust gas tract 5 is used so as to discharge exhaust gas from the internal combustion engine 2. A turbine 6 of an exhaust gas turbo charger is arranged in the exhaust gas tract 5. A nitric oxide adsorption catalytic converter (LNT) 7 is arranged downstream of the turbine 6. An oxidation catalytic converter may also be arranged in lieu of an LNT. A first catalytic converter for selective catalytic reduction (SCR) 8 is arranged downstream of the LNT 7 and a second SCR 9 is arranged downstream of the first SCR. Further exhaust gas treatment devices may comprise for example a particulate filter that may also be combined for example with the first SCR 8. The second SCR 9 is optional, in other words in an alternative embodiment of the arrangement 1 it is also possible in lieu of the second SCR to provide another catalytic converter or also not to provide any further catalytic converters.

As such, upstream and downstream may be used to provide a relative arrangement of components. With regard to the exhaust gas tract 5, components arranged more upstream may be closer to the engine 2 and receive exhaust gas prior to components arranged more downstream. As one specific example, the LNT 7 is upstream of the first SCR 8, the first SCR 8 being upstream of the second SCR 9.

A device 10 for introducing a reducing agent is arranged directly upstream of the first SCR 8. The reducing agent is stored in a container outside of the exhaust gas tract from where said reducing agent is guided into the exhaust gas tract 5. Conventionally, an aqueous urea solution is introduced as a reducing agent, said aqueous urea solution being hydrolyzed to gaseous ammonia in the exhaust gas tract 5. In one example, the aqueous urea solution is AdBlue. However, gaseous ammonia may also be directly introduced into the exhaust gas tract 5.

An exhaust gas recirculating line 11 branches off from the exhaust gas tract 5, said exhaust gas recirculating line being embodied via the branch upstream of the turbine 6 as a high pressure exhaust gas recirculating line 11 (interchangeably referred to as HP-EGR line 11). The high pressure exhaust gas recirculating line 11 issues into the intake tract 4 downstream of a compressor of the exhaust gas turbo charger and a possible intake throttle valve (both not illustrated).

An exhaust gas recirculating line 12 of a low pressure exhaust gas recirculating system branches off from the exhaust gas tract 5 downstream of the first SCR 8. The low pressure exhaust gas recirculating line 12 (interchangeably referred to herein as LP-EGR line 12) issues into the intake tract 4 upstream of the compressor. An exhaust gas recirculating valve (not illustrated) may be arranged respectively in the exhaust gas recirculating lines 11, 12 so as to control the recirculation of exhaust gas, wherein alternatively the control may also be performed via throttle flaps. The flow direction of the exhaust gas is indicated via the illustrated arrows.

Nitric oxide sensors may be arranged in the exhaust gas tract 5 so as to measure the concentration of nitric oxide. A first nitric oxide sensor 13 is arranged directly downstream of the turbine 6. A second nitric oxide sensor 14 is arranged downstream of the second SCR 9 in the exhaust region of the exhaust gas tract 5. Further nitric oxide sensors may be arranged in further regions of the exhaust gas tract 5, of the exhaust recirculating lines 11, 12 and in the intake tract 4. A corresponding sensor 15 is arranged directly upstream of the internal combustion engine 2 so as to measure the proportion of the combusted gas mass in the exhaust gas tract (fman), said sensor referred to in short as an fman sensor 15. Further sensors may be arranged in the exhaust gas tract, exhaust gas recirculating lines and in the intake tract 4, for example temperature sensors, pressure sensors inter alia.

The sensors transmit measured values to a control device 16. The control device 16 is embodied so as to implement the method in accordance with the invention with which a decision is made as to whether exhaust gas is to be recirculated via the high pressure exhaust gas recirculating line 11 or the low pressure exhaust gas recirculating line 12. For this purpose, the control device 16 is connected to the corresponding exhaust gas recirculating valves that are opened and closed according to the control command.

Figure 2:
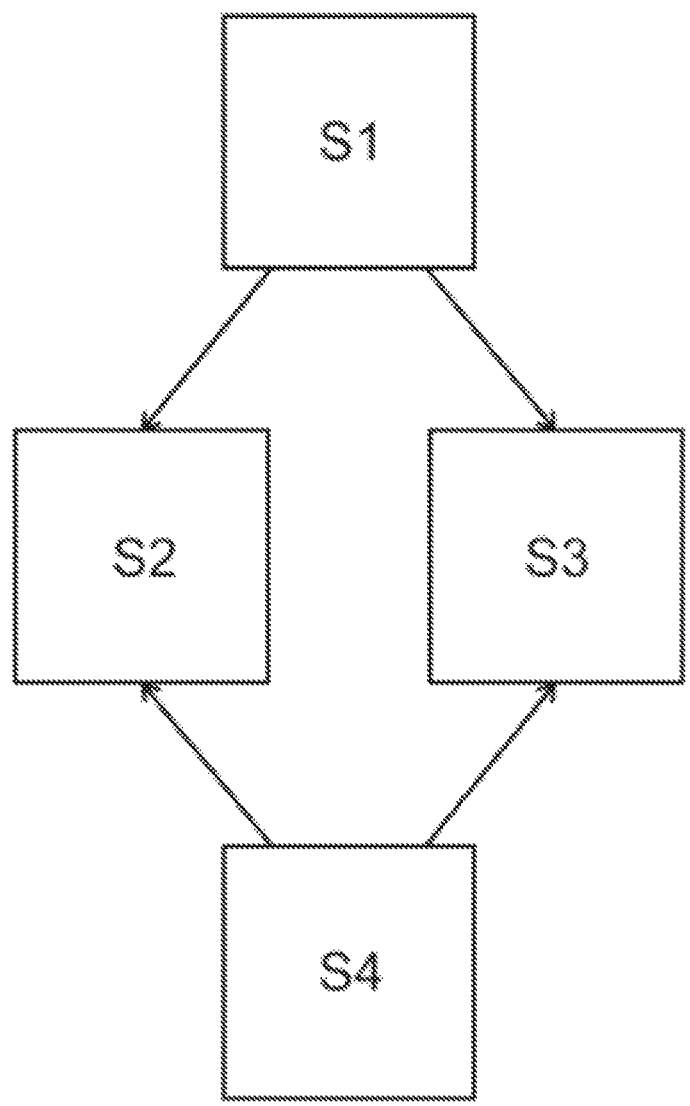
FIG. 2 illustrates a flow diagram of an embodiment of the method in accordance with the disclosure.
Figure 3:
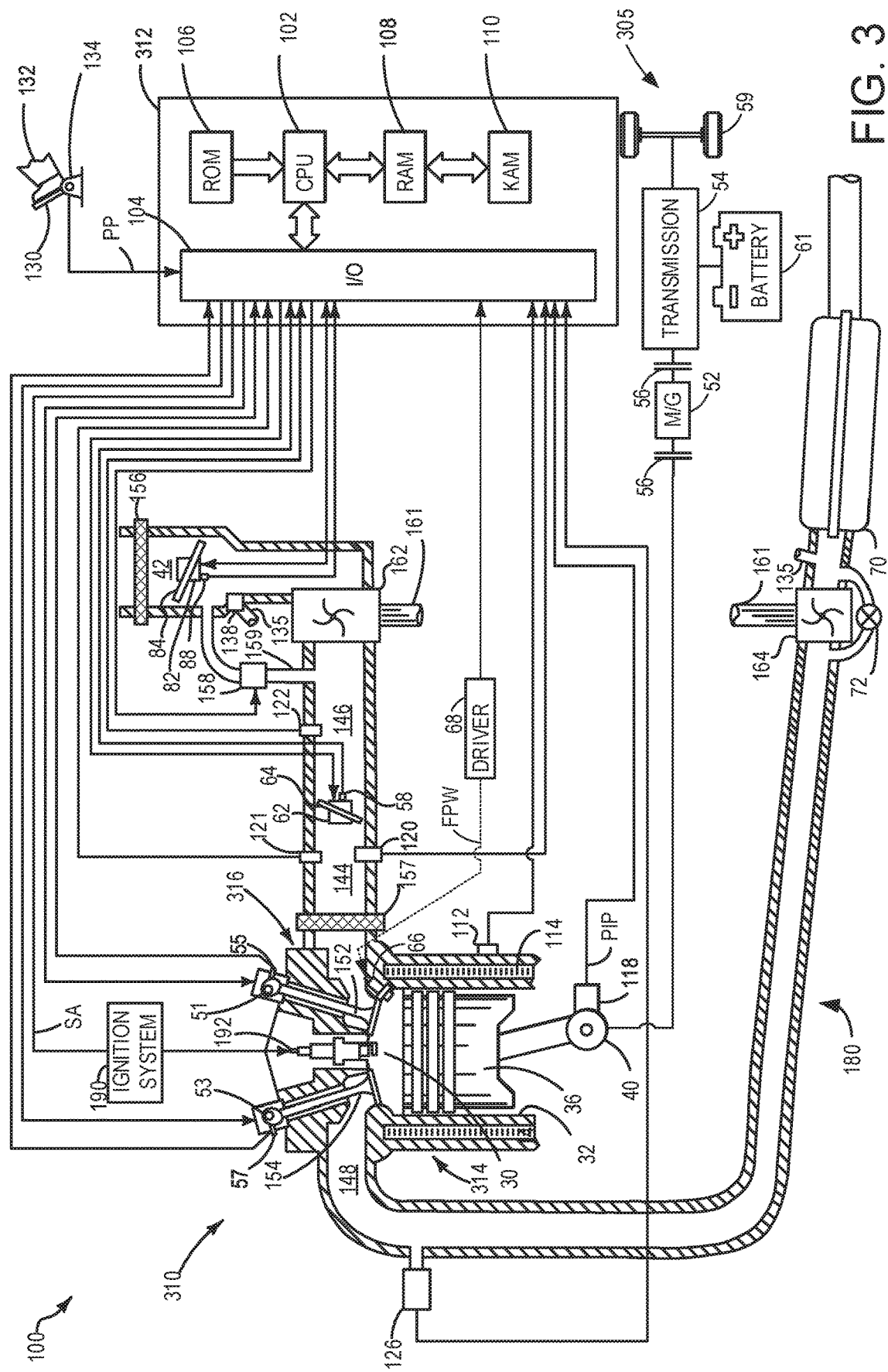
FIG. 3 illustrates a schematic of an engine included in a hybrid vehicle.

Turning now to FIG. 2, it shows one embodiment of a method in accordance with the disclosure, in a first step S1 the internal combustion engine is operated when exhaust gas is recirculated through the low pressure exhaust gas recirculating line (LP mode). In a second step S2, a difference value with regard to the quantity of ammonia desired is determined between using the high pressure exhaust gas recirculating line and using the low pressure exhaust gas recirculating line.

For this purpose, in order to establish the quantity of ammonia desired in the low pressure exhaust gas recirculating operation mNH3_LP, the sensor values CNOx_FG_sen with regard to the nitric oxide emission from the internal combustion engine 2 are determined via the nitric oxide sensor 14 and are used in the formula (1), wherein the parameters for the quantity of recirculated nitric oxide and ammonia may be determined in a model-based manner. Alternatively, the quantity of ammonia desired may also be determined for the low pressure exhaust gas recirculating line in a completely model-based manner via the formula (2).

The theoretical quantity of ammonia desired for the high pressure exhaust gas recirculating operation mNH3_HP may be equivalent to the magnitude of the nitric oxide emission from the internal combustion engine 2. Since in the low pressure mode the high pressure exhaust gas recirculating line is not used and corresponding measured values may not be received, for this purpose the theoretical quantity of ammonia desired may only be determined in a model-based manner via the formula (3).

If the difference value of mNH3_LP−mNH3_HP is greater than zero, the quantity of ammonia desired is lower in the HP mode. If the difference value of mNH3_LP−mNH3_HP is less than zero, the quantity of ammonia desired in the LP mode is lower.

In a similar manner to step S2, in a third step S3 the difference value with regard to the magnitude of the nitric oxide emission is determined between a high pressure exhaust gas recirculating operation and a low pressure exhaust gas recirculating operation. Step S3 is performed simultaneously with step S2 during the ongoing operation. In the LP mode, the quantity of nitric oxide CNOx_FG_sen is determined in a sensor-based manner via feedback from the sensors 13 and/or 14. The quantity of nitric oxide may also be determined in a model-based manner.

If the difference value of mNOOx_LP−mNOx_HP is greater than zero, the magnitude of the nitric oxide emission in the HP mode is lower. If the difference value of mNOx_LP−mNOx_HP is less than or equal to zero, the magnitude of the nitric oxide emission is lower in the LP mode.

In a fourth step S4, the values that are determined are analyzed and in dependence upon the determined difference values with regard to the quantity of ammonia desired and the magnitude of nitric oxide emission a decision is made as to whether to switch from the low pressure mode into the high pressure mode or conversely. The mode is selected that is characterized by a lower quantity of ammonia desired and lower magnitude of the nitric oxide emission. In this case, both values are evaluated together.

For the HP mode, the method progresses in an essentially similar manner. If more advantageous delta values are determined for the HP mode than for the LP mode, a switch is made from the LP mode into the HP mode, in other words the high pressure exhaust gas recirculating line is used in lieu of the low pressure exhaust gas recirculating line. If more advantageous delta values are determined for the LP mode than for the HP mode, the arrangement 1 remains in the LP mode.

If the internal combustion engine is operated in step S1 in the HP mode, in step S2 the quantity of ammonia desired in the HP mode mNH3_HP is determined based upon sensor values using the formula (4). Alternatively, the quantity of ammonia desired may also be determined in the HP mode in a model-based manner via the formula (3). The magnitude of the nitric oxide emission in the HP mode is determined in step S3 in a similar manner to the LP mode in a sensor-based manner by means of the sensors 13 and/or 14 or in a model-based manner.

If more advantageous difference values are determined for the HP mode than for the LP mode, the arrangement 1 remains in the HP mode. If more advantageous difference values are determined for the LP mode than for the HP mode, a switch is made from the HP mode into the LP mode, in other words the low pressure exhaust gas recirculating line is used in lieu of the high pressure exhaust gas recirculating line.

The steps of the method may be performed continuously, in other words measurements and corresponding adjustments of the use of the exhaust gas recirculating lines are continuously performed. In this case optionally the two exhaust gas recirculating lines may also be used simultaneously so as to recirculate exhaust gas and the rates of the recirculated exhaust gas are varied between the exhaust gas recirculating lines according to the prevailing delta values.

In one example, the HP-EGR mode may become more efficient than the LP-EGR more when the second SCR device 9 requests reductant. For example, ammonia slip through the second SCR device 9 may fall below a threshold slip, which may be sensed by second nitric oxide sensor 14. To replenish the second SCR device 9 with ammonia, the injector 10 may begin to inject reductant, which may flow through the first SCR device 8 after inundating it with reductant, to the second SCR device 9. However, the LP-EGR line 12 is arranged between the first and second SCR devices 8, 9, which may lead to a relative high amount of ammonia being recirculated to the engine 2. As such, NO$_x$ production may increase during conditions where the second SCR device 9 requests reductant and EGR is desired. Therefore, it may be more efficient to enter the HP-EGR mode. This may preserve reductant and decrease NO$_x$ emissions.

FIG. 3 depicts an engine system 100 for a vehicle. The vehicle may be an on-road vehicle having drive wheels which contact a road surface. Engine system 100 includes engine 310 which comprises a plurality of cylinders. Engine 310 may be used similarly to the engine 2 of FIG. 1 FIG. 3 describes one such cylinder or combustion chamber in detail. The various components of engine 310 may be controlled by electronic engine controller 312. Controller 312 may be used similarly to control device 16 of FIG. 1.

Engine 310 includes a cylinder block 314 including at least one cylinder bore, and a cylinder head 316 including intake valves 152 and exhaust valves 154. In other examples, the cylinder head 316 may include one or more intake ports and/or exhaust ports in examples where the engine 310 is configured as a two-stroke engine. The cylinder block 314 includes cylinder walls 32 with piston 36 positioned therein and connected to crankshaft 40. Thus, when coupled together, the cylinder head 316 and cylinder block 314 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 314, piston 36, and cylinder head 316. Cylinder block 314 may include the cylinder walls 32, piston 36, crankshaft 40, etc. Cylinder head 316 may include one or more fuel injectors such as fuel injector 66, one or more intake valves 152, and one or more exhaust valves such as exhaust valves 154. The cylinder head 316 may be coupled to the cylinder block 314 via fasteners, such as bolts and/or screws. In particular, when coupled, the cylinder block 314 and cylinder head 316 may be in sealing contact with one another via a gasket, and as such the cylinder block 314 and cylinder head 316 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 310.

In some examples, each cylinder of engine 310 may include a spark plug 192 for initiating combustion. Ignition system 190 can provide an ignition spark to cylinder 30 via spark plug 192 in response to spark advance signal SA from controller 312, under select operating modes. However, in some embodiments, spark plug 192 may be omitted, such as where engine 310 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 312. Fuel is delivered to fuel injector 66 by a fuel system (not shown) including a fuel tank, fuel pump, and fuel rail. Fuel injector 66 is supplied operating current from driver 68 which responds to controller 312. In some examples, the engine 310 may be a gasoline engine, and the fuel tank may include gasoline, which may be injected by injector 66 into the combustion chamber 30. However, in other examples, the engine 310 may be a diesel engine, and the fuel tank may include diesel fuel, which may be injected by injector 66 into the combustion chamber. Further, in such examples where the engine 310 is configured as a diesel engine, the engine 310 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 310 is configured to provide exhaust gas recirculation, or EGR. When included, EGR may be provided as high-pressure EGR and/or low-pressure EGR. In examples where the engine 310 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 3). In some examples, air intake passage 42 may include an air box (not shown) with a filter. In one example, compressor 162 may be a turbocharger, where power to the compressor 162 is drawn from the flow of exhaust gases through turbine 164. Turbine 164 may be used similarly to turbine 6 of FIG. 1. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 3, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 312. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 312 is shown in FIG. 3 as a microcomputer including: microprocessor unit 102, input/output ports 104, read-only memory 106, random access memory 108, keep alive memory 110, and a conventional data bus. Controller 312 is shown receiving various signals from sensors coupled to engine 310, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 312. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 305 may be a hybrid vehicle with multiple sources of torque available to one or more vehicle wheels 59. In other examples, vehicle 305 is a conventional vehicle with only an engine, or an electric vehicle with only electric machine(s). In the example shown, vehicle 305 includes engine 310 and an electric machine 52. Electric machine 52 may be a motor or a motor/generator. Crankshaft 40 of engine 310 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 312 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 312 receives signals from the various sensors of FIG. 3 and employs the various actuators of FIG. 3 to adjust engine operation based on the received signals and instructions stored on a memory of the controller. For example, adjusting operation of the electric machine 52 may occur based on feedback from ECT sensor 112. As will be described in greater detail below, the engine 310 and electric machine 52 may be adjusted such that their operations may be delayed based on one or more of a powertrain temperature, which may be estimated based on feedback from ECT sensor 112, and a distance between an intended destination and an electric-only operation range.

Figure 4:
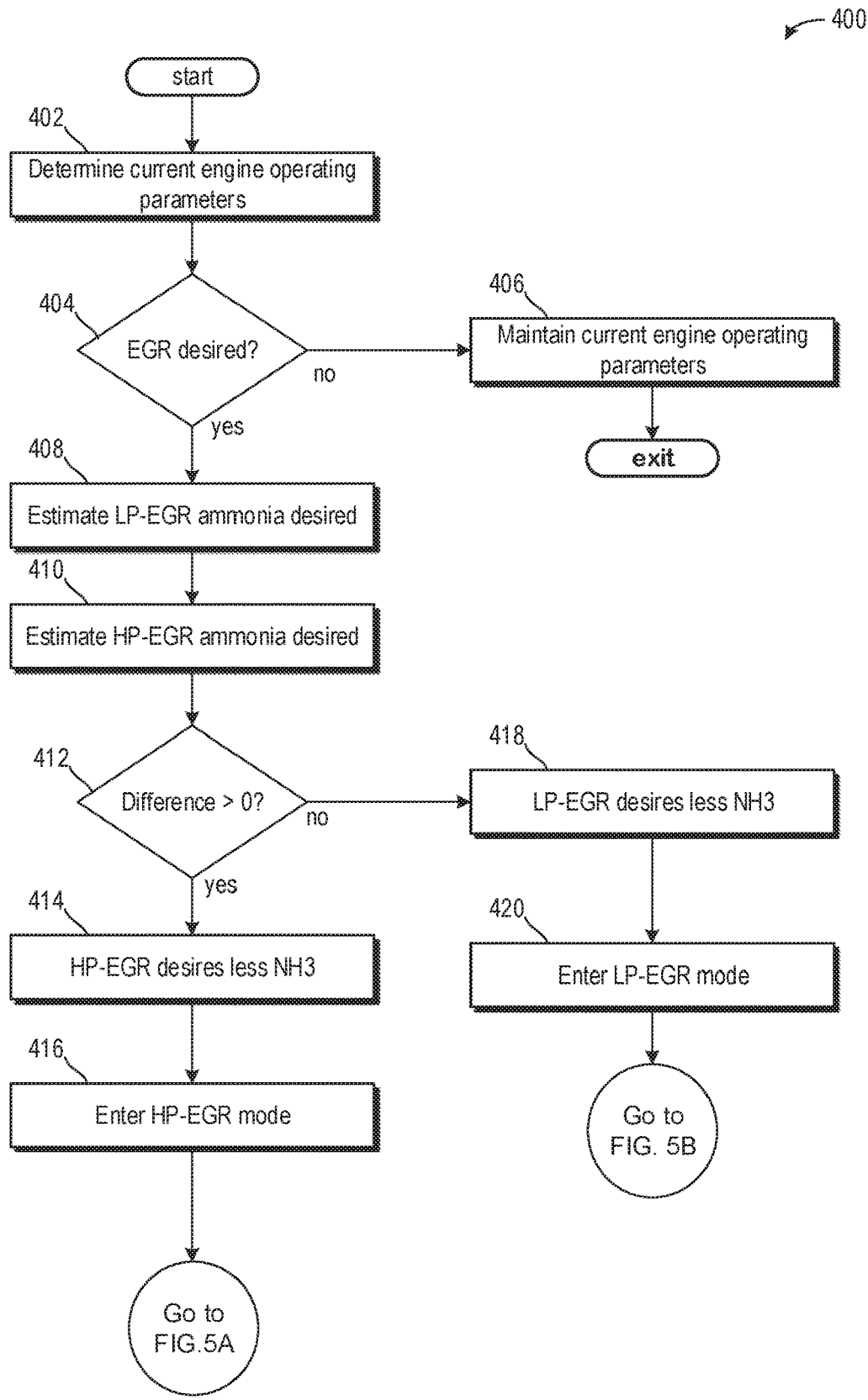
FIG. 4 illustrates a method for selecting HP-EGR or LP-EGR in response to an ammonia concentration.

Turning now to FIG. 4, it shows a method 400 for determining to enter an HP-EGR mode or a LP-EGR mode based on an amount of ammonia desired in each. Instructions for carrying out method 400 and the rest of the methods included herein may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below.

The method 400 begins at 402, which includes determining, estimating, and/or measuring current engine operating parameters. Current engine operating parameters may include, but are not limited to, one or more of throttle position, manifold vacuum, engine speed, engine temperature, and air/fuel ratio.

The method 400 may proceed to 404, which may include determining if EGR is desired. EGR may be desired if knock is likely, if throttle losses are occurring, or the like. EGR may not be desired during some high engine loads, as it may decrease an overall power output. However, in some examples, EGR may be delivered during high loads to mitigate knock and decrease emissions. Additionally or alternatively, EGR may not be desired during low loads and/or idle, as combustion conditions may become unstable with the inclusion of EGR. If EGR is not desired, then the method 400 may proceed to 406 to maintain current engine operating parameters and does not flow HP-EGR or LP-EGR.

If EGR is desired, then the method 400 proceeds to 408, which may include estimating an LP-EGR ammonia desired. As described above, the LP-EGR ammonia desired may be estimated via feedback from sensors and/or via a model. Formula (1) may be used to estimate the LP-EGR ammonia desired if sensors are being used and formula (2) may be used to estimate the LP-EGR ammonia desired if the model is being used. With regard to formula (1), the LP-EGR ammonia may be substantially equal to a total engine NOx output, which may be measured by first nitric oxide sensor 13 of FIG. 1, minus an amount of NOx recirculated to the engine, which may be measured by sensor 15 or some other sensor of FIG. 1, and plus an amount of ammonia slip through the SCR catalysts. The model based estimation may calculate the LP-EGR ammonia desired to be substantially equal to engine NOx production in the absence of recirculated ammonia and NOx, plus engine NOx production due to recirculated ammonia slip and recirculated NOx, and plus ammonia slip through the tailpipe. The model may look up values in a multi-input look-up table, wherein inputs may correspond to engine speed, air/fuel ratio, EGR flow rate, engine temperature, and the like. In some examples, the method 400 may use each of the model and sensor based calculations and determine an average LP-EGR ammonia desired.

The method 400 proceeds to 410, which may include estimating an HP-EGR ammonia desired. As described above, the HP-EGR ammonia desired may be estimated via a model-based approach using formula (3) or a sensor based approach using formula (4). While ammonia slip may not affect engine NOx production due to the arrangement of the HP-EGR line 11 of FIG. 1, the ammonia slip through the tailpipe may still be factored into the HP-EGR desired The method 400 may proceed to 412, which may include determining a difference between the LP-EGR ammonia desired and the HP-EGR ammonia desired. More specifically, the method may include determining if the difference between the LP-EGR ammonia desired and the HP-EGR ammonia desired is greater than 0. If the difference is greater than 0, then the LP-EGR ammonia desired is greater than the HP-EGR ammonia desired, thereby indicating that operating in the LP-EGR mode may demand more ammonia than operating in the HP-EGR mode. As such, the LP-EGR mode may be less efficient than the HP-EGR mode. If the difference is less than or equal to 0, then the LP-EGR ammonia desired may be less than or equal to the HP-EGR ammonia desired, thereby indicating that operating in the LP-EGR mode may be more efficient due to less ammonia being used during the LP-EGR mode. In the case where the difference is equal to 0, LP-EGR may be desired over HP-EGR due to decreased combustion temperatures. In some examples, additionally or alternatively, if the difference is equal to 0, then a mixture of LP- and HP-EGR may be used.

If the difference is greater than 0, then the method 400 may proceed to 414, which may include the HP-EGR desiring less ammonia. As such, the method 400 may proceed to 416, which may include entering the HP-EGR mode. The HP-EGR mode may include opening a valve in the HP-EGR line and closing a valve in a LP-EGR line so that only HP-EGR flows to the intake tract. Following entering the HP-EGR mode, the method 400 may proceed to 502 of method 500 of FIG. 5A.

Figure 5A:
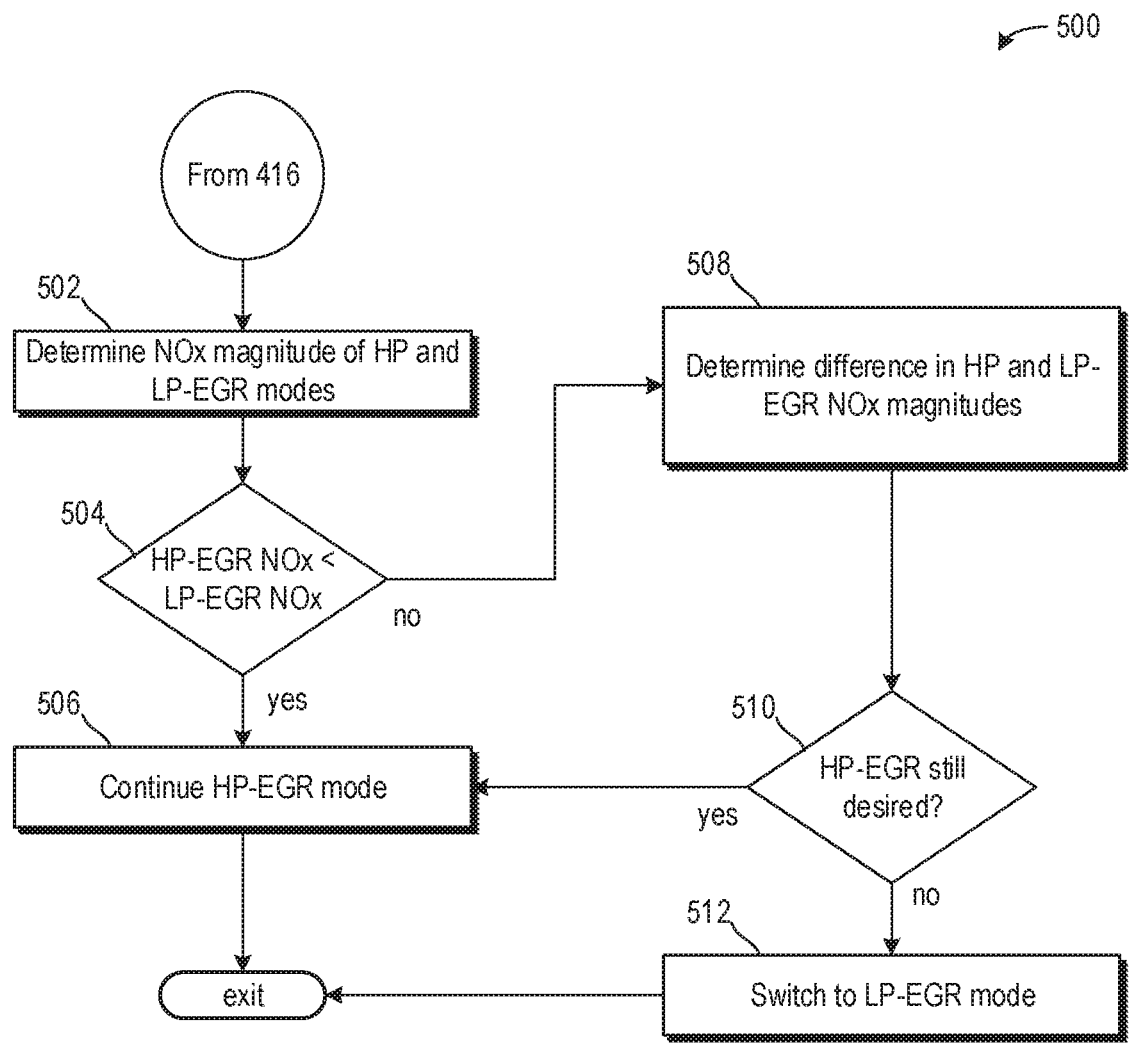
FIGS. 5A and 5B illustrate methods for switching an EGR operation in response to $NO_x$ production.

Turning now to FIG. 5A, it shows a method 500 selecting an EGR mode based on an estimated NOx magnitude. In the example of FIGS. 4 and 5A, the method 400 is executed before the method 500. However, in other examples, the selection of an EGR mode may occur following execution of the method 400 and execution of method 500 of FIG. 5A and method 550 of FIG. 5B described below.

Method 500 begins at 502, which includes determining a NOx magnitude of the HP- and LP-EGR modes. In the example of FIG. 5A, the HP-EGR NOx magnitude may be estimated via feedback from one or more sensors (e.g., combination of sensor 15 and sensor 13 of FIG. 1). The LP-EGR NOx magnitude may be estimated since LP-EGR is not flowing as described above.

The method 500 may proceed to 504, which may include determining if the HP-EGR NOx magnitude is less than the LP-EGR NOx magnitude. In one example, the HP-EGR NOx magnitude may be lower than the LP-EGR NOx magnitude due to ammonia being recirculated to the engine and converted into NOx. If the HP-EGR NOx magnitude is lower than the LP-EGR NOx magnitude, then the method 500 may proceed to 506, which may include continuing to operating in the HP-EGR mode.

Additionally or alternatively, the HP-EGRNO$_x$ magnitude may be subtracted from the LP-EGR NO$_x$ magnitude. If the result is greater than 0, then the HP-EGR NO$_x$ magnitude is lower than the LP-EGR NO$_x$ magnitude, and HP-EGR may be desired. If the result is less than 0, then the HP-EGRNO$_x$ magnitude is greater than the LP-EGR magnitude, and LP-EGR may be desired. If the result is equal to 0, then the HP-EGR NO$_x$ magnitude and the LP-EGR NO$_x$ magnitude may be equal and the NO$_x$ magnitudes of each may be ignored.

If the HP-EGR NOx magnitude is not lower than the LP-EGR NOx magnitude, then the method 500 may proceed to 508, which may include determining the difference between the HP- and LP-EGR NOx magnitudes.

The method 500 proceeds to 510, which may include determining if HP-EGR is still desired. This may include determining if a difference between the HP-EGR ammonia desired and the LP-EGR ammonia desired is greater than the difference between the HP- and LP-EGR magnitudes. That is to say, despite the HP-EGR NOx magnitude being greater than the LP-EGR NOx magnitude, HP-EGR may still be desired if the HP-EGR ammonia desired is sufficiently less than the LP-EGR ammonia desired. In some examples, HP-EGR may still be desired if the difference between the HP- and LP-EGR ammonia desired is greater than the difference between the HP- and LP-EGR NOx magnitudes. In some examples, HP-EGR may still be desired if the difference between the HP- and LP-EGR ammonia desired is 1.25 times greater than the difference between the HP- and LP-EGR NOx magnitudes. In some examples, HP-EGR may still be desired if the difference between the HP- and LP-EGR ammonia desired is 1.5 times greater than the difference between the HP- and LP-EGR NOx magnitudes. In some examples, HP-EGR may still be desired if the difference between the HP- and LP-EGR ammonia desired is 2 times greater than the difference between the HP- and LP-EGR NOx magnitudes. If HP-EGR is still desired, the method 500 may proceed to 506 to continue operating in the HP-EGR mode. If HP-EGR is not desired, and the HP-EGR NOx magnitude offsets the benefit of the HP-EGR ammonia desired, then the method 500 proceeds to 512, which may include switching to the LP-EGR mode. This may include closing the valve in the HP-EGR line and opening the valve in the LP-EGR line.

Returning to 412 of FIG. 4, if the difference is less than or equal to 0, then the method 400 may proceed to 418, which may include the LP-EGR desiring less ammonia than the HP-EGR. As such, the method 400 may proceed to 416, which may include entering the LP-EGR mode at 420. The LP-EGR mode may include opening the valve in the LP-EGR and closing the valve in the HP-EGR line so that only LP-EGR flows to the intake tract. Following entering the LP-EGR mode, the method 400 may proceed to 552 of method 500 of FIG. 5B.

Figure 5B:
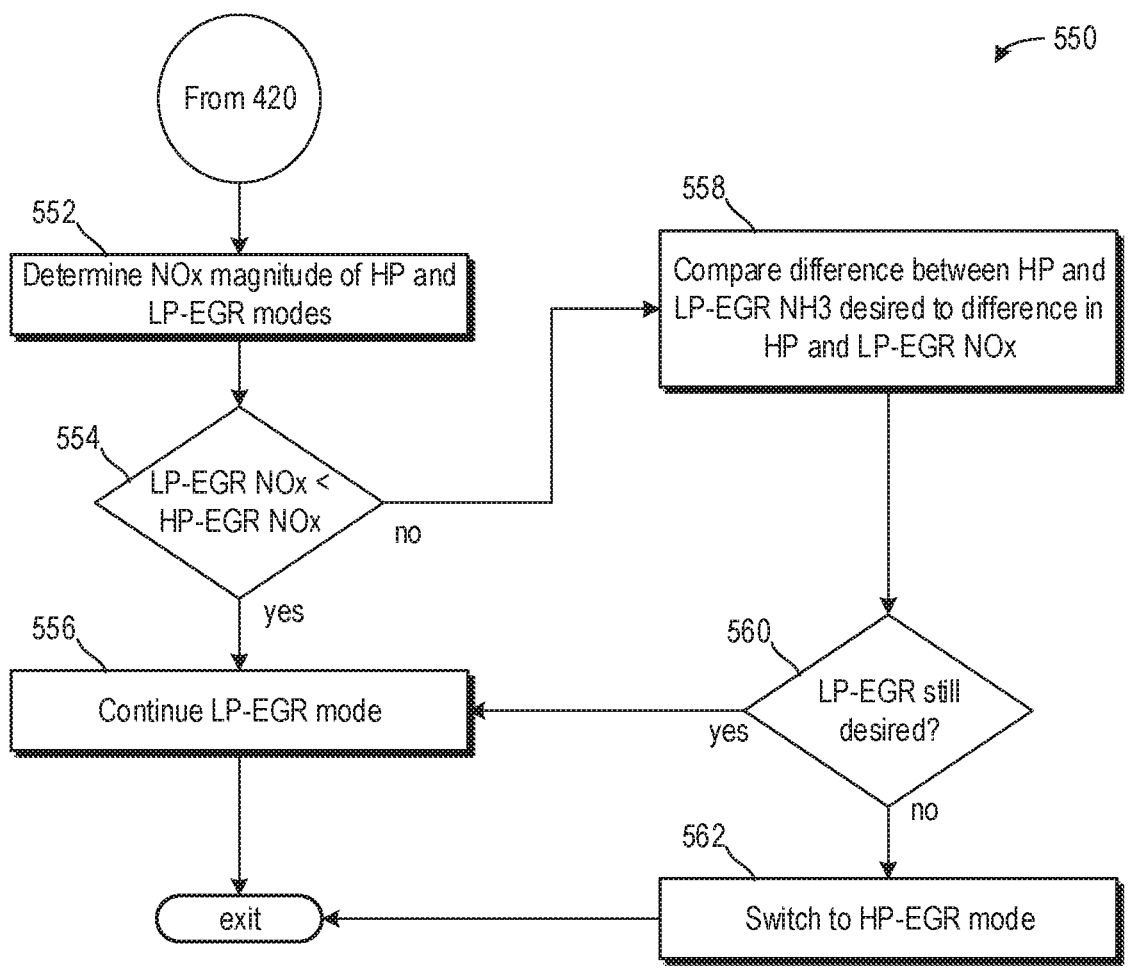

Turning now to FIG. 5B, it shows the method 550 for selecting an EGR mode based on an estimated NOx magnitude. The method 550 may be similar to the method 500, except that the method 550 begins with the LP-EGR mode being selected and HP-EGR being shut-off.

Method 550 begins at 502, which includes determining a NOx magnitude of the HP- and LP-EGR modes. In the example of FIG. 5B, the LP-EGR NOx magnitude may be estimated via feedback from one or more sensors (e.g., combination of sensor 15 and sensor 13 of FIG. 1). The HP-EGR NOx magnitude may be estimated since HP-EGR is not flowing as described above.

The method 550 may proceed to 554, which may include determining if the LP-EGR NOx magnitude is less than the HP-EGR NOx magnitude. In one example, the LP-EGR NOx magnitude may be lower than the HP-EGR NOx magnitude due to lower combustion temperatures and recirculated ammonia being relatively low. If the LP-EGR NOx magnitude is lower than the HP-EGR NOx magnitude, then the method 550 may proceed to 556, which may include continuing to operating in the LP-EGR mode. This may include maintaining the valve in the HP-EGR line closed to block HP-EGR flow to the intake tract.

If the LP-EGR NOx magnitude is not lower than the HP-EGR NOx magnitude, which may be due to a relative high amount of ammonia being recirculated, then the method 550 may proceed to 558, which may include determining the difference between the LP- and HP-EGR NOx magnitudes.

The method 550 proceeds to 560, which may include determining if LP-EGR is still desired. This may include determining if a difference between the LP-EGR ammonia desired and the HP-EGR ammonia desired is greater than the difference between the LP- and HP-EGR magnitudes. That is to say, despite the LP-EGR NOx magnitude being greater than the HP-EGR NOx magnitude, LP-EGR may still be desired if the LP-EGR ammonia desired is sufficiently less than the HP-EGR ammonia desired. In some examples, LP-EGR may still be desired if the difference between the LP- and HP-EGR ammonia desired is greater than the difference between the LP- and HP-EGR NOx magnitudes. In some examples, LP-EGR may still be desired if the difference between the LP- and HP-EGR ammonia desired is 1.25 times greater than the difference between the LP- and HP-EGR NOx magnitudes. In some examples, LP-EGR may still be desired if the difference between the LP- and HP-EGR ammonia desired is 1.5 times greater than the difference between the LP- and HP-EGR NOx magnitudes. In some examples, LP-EGR may still be desired if the difference between the LP- and HP-EGR ammonia desired is two times greater than the difference between the LP- and HP-EGR NOx magnitudes. If LP-EGR is still desired, the method 550 may proceed to 556 to continue operating in the LP-EGR mode. If LP-EGR is no longer desired, and the LP-EGR NOx magnitude offsets the benefit of the LP-EGR ammonia desired, then the method 550 proceeds to 562, which may include switching to the HP-EGR mode. This may include closing the valve in the LP-EGR line to block LP-EGR and opening the valve in the HP-EGR line.

In this way, an engine operation may switch between HP-EGR and LP-EGR in response to ammonia desired and NOx produced during each. The technical effect of adjusting EGR operation between the HP-EGR mode and the LP-EGR mode in response to ammonia desired and NOx production is to select an EGR mode that is more efficient. By doing this, less ammonia may be consumed and less NOx may be released through the tailpipe overall.

In another representation, a method for controlling recirculated exhaust gas in an arrangement of an internal combustion engine having an exhaust gas tract, wherein at least one first catalytic converter for selective catalytic reduction (SCR), at least one first device for introducing ammonia into the exhaust gas tract are arranged upstream of the first SCR, and also at least one high pressure exhaust gas recirculating line branches off upstream of the first SCR and at least one low pressure exhaust gas recirculating line branches off downstream of the first SCR, the arrangement furthermore comprising a control device, and wherein exhaust gas is guided in a controlled manner by means of an algorithm through the low pressure exhaust gas recirculating line or high pressure exhaust gas recirculating line in dependence upon the quantity of ammonia required and the magnitude of the nitric oxide emission, said method comprising operating the internal combustion engine when recirculating exhaust gas through the low pressure exhaust gas recirculating line or the high pressure exhaust gas recirculating line, determining a difference value with regard to the quantity of ammonia desired by the first SCR between using the high pressure exhaust gas recirculating line (HP mode) and using the low pressure exhaust gas recirculating line (LP mode), determining a difference value with regard to the magnitude of the nitric oxide emission to the environment between an HP mode and an LP mode, switching between HP mode and LP mode based on the determined difference values with regard to the quantity of ammonia desired and the magnitude of the nitric oxide emission, wherein the mode is selected that is characterized by virtue of a lower quantity of ammonia required and/or a lower magnitude of nitric oxide emission.

The method further comprises where in the low pressure mode the quantity of ammonia desired for the low pressure exhaust gas recirculating operation is determined using sensor-based values with regard to the quantity of nitric oxide $C_{Nox\_FG\_sen}$ present in the exhaust gas that is directly emitted by the internal combustion engine by a relationship $C_{NH3\_LP}=C_{NOx\_FG\_sen}-C_{NOx\_NOxrec\_est}+C_{NH3\_rec\_est}$; wherein $C_{NH3\_LP}$ is the quantity of ammonia desired for the low pressure mode, $C_{NOx\_NOxrec\_est}$ is the calculated quantity of nitric oxides present in the exhaust gas that is directly emitted by the internal combustion engine, said quantity being increased as a result of the recirculation of nitric oxides that are present in the exhaust gas but not removed via the first SCR, and $C_{NH3\_rec\_est}$ is the calculated quantity of ammonia being recirculated through the LP-EGR.

The method further comprises where in the low pressure mode the quantity of ammonia desired for the low pressure exhaust gas recirculating operation is determined in the case of model-based values with regard to the quantity of nitric oxides $C_{Nox\_FG\_mod}$ present in the exhaust gas that is directly emitted by the internal combustion engine using the relationship $C_{NH3\_LP}=C_{NOx\_FG\_base}+C_{NOx\_NH3rec\_est}+C_{NH3\_rec\_est}$; wherein $C_{NOx\_NH3rec}$ is the quantity of nitric oxide that is increased via the ammonia combustion, and wherein $C_{NOx\_FG\_base}$ is based on the condition that neither nitric oxide nor ammonia are recirculated.

The method further comprises where in the low pressure mode the quantity of ammonia desired for the high pressure exhaust gas operation is determined using model-based values with regard to the quantity of nitric oxides $C_{NOx\_FG\_est}$ present in the exhaust gas that is directly emitted by the internal combustion engine using the relationship $C_{NH3\_LP}=C_{NOx\_FG\_est}$.

The method further comprises where in the high pressure mode the quantity of ammonia desired in the high pressure recirculating circuit is determined using sensor-based values with regard to the quantity of nitric oxides $C_{NOx\_FG\_sen}$ present in the exhaust gas that is directly emitted by the internal combustion engine using the relationship $C_{NH3\_HP}=C_{NOx\_FG\_sen}$.

The method further comprises wherein the high pressure mode the quantity of ammonia desired in the high pressure recirculating operation is calculated using model-based values with regard to the quantity of nitric oxides $C_{NOx\_FG\_est}$ present in the exhaust gas that is directly emitted by the internal combustion engine using the relationship $C_{NH3\_HP}=C_{NOx\_FG\_est}$.

The method further comprises where when recirculating exhaust gas through the high pressure exhaust gas recirculation the quantity of ammonia desired in the low pressure exhaust gas recirculating circuit is determined using model-based values with regard to the quantity of nitric oxides $C_{NOx\_FG\_base}$ present in the exhaust gas that is directly emitted by the internal combustion engine using the relationship $C_{NH3\_LP}=C_{NOx\_FG\_base}+C_{NOx\_NH3\_rec\_est}+C_{NH3\_rec\_est}$.

The method further comprises where the difference values with regard to the quantity of ammonia desired between the integrals of the values or the filtered variables with regard to the ammonia for the low pressure exhaust gas recirculating operation $C_{NH3\_LP}$ and for the high pressure exhaust gas recirculating operation $C_{NH3\_HP}$ are determined over a specific time interval, wherein in the case of $m_{NH3m\_LP}-m_{NH3\_HP}>0$; for the high pressure exhaust gas recirculating operation, the quantity of ammonia desired is lower than in the low pressure exhaust gas recirculating operation, and in the case of $m_{NH3\_LP}-m_{NH3\_HP}<0$; for the low pressure exhaust gas recirculating operation the quantity of ammonia desired is lower than in the high pressure exhaust gas recirculating operation.

The method further comprises where in the low pressure mode the magnitude of the nitric oxide emission in the exhaust region for the low pressure exhaust gas recirculating operation is determined on the basis of sensor-based values with regard to the quantity of nitric oxides $C_{NOx\_FG\_sen}$ present in the exhaust gas that is directly emitted by the internal combustion engine or is determined on model-based values with regard to the quantity of nitric oxides $C_{NOx\_FG\_est}$ present in the exhaust gas that is directly emitted by the internal combustion engine, and the magnitude of nitric oxide emission in the exhaust region for the high pressure exhaust gas recirculating operation is determined in a model based manner under the assumption that exhaust gas has been recirculated through the high pressure exhaust gas recirculating line.

The method further comprises where in the high pressure mode the magnitude of the nitric oxide emission in the exhaust region for the low pressure exhaust gas recirculating operation is determined in a model-based manner under the assumption that exhaust gas has been recirculated through the low pressure exhaust gas recirculating line, and the magnitude of the nitric oxide emission in the exhaust region for the high pressure exhaust gas recirculating operation is determined on the basis of sensor-based values with regard to the quantity of nitric oxides $C_{NOx\_FG\_sen}$ present in the exhaust gas that is directly emitted by the internal combustion engine or on model-based values with regard to the quantity of nitric oxides $C_{NOx\_FG\_base}$ present in the exhaust gas that is directly emitted by the internal combustion engine.

The method further comprises where the difference values with regard to the magnitude of the nitric oxide emission are determined from the difference between the integral values of the mass flows of the magnitude of the nitric oxide emission over a time interval for the low pressure exhaust gas recirculating operation $m_{NOx\_LP}$ and for the high pressure exhaust gas recirculating operation $m_{NOx\_HP}$, wherein in the case of $m_{NOx\_LP} - m_{NOx\_HP} > 0$, the magnitude of the nitric oxide emission in the high pressure exhaust gas recirculating operation is lower than in the low pressure exhaust gas recirculating operation, and in the case of $m_{NOx\_LP} - m_{NOx\_HP} < 0$, the magnitude of the nitric oxide emission in the low pressure exhaust gas recirculating operation is lower than in the high pressure exhaust gas recirculating operation.

In one embodiment, a method comprises determining a first difference between a quantity of ammonia desired by an SCR device during a LP-EGR mode and a HP-EGR mode, determining a second difference between an amount of nitric oxide emission during the LP-EGR mode and the HP-EGR mode, and selecting one of the LP-EGR mode and the HP-EGR mode based on a comparison of the first and second differences. A first example of the method further includes where the quantity of ammonia desired during the LP-EGR mode is calculated via estimating an amount of nitric oxide generated by an engine and an amount of ammonia recirculated through an LP-EGR line to the engine. A second example of the method, optionally including the first example, further includes where the quantity of ammonia desired during the LP-EGR mode is model-based when HP-EGR is flowing. A third example of the method, optionally including the first and/or second examples, further includes where the quantity of ammonia desired is calculated when LP-EGR is flowing via feedback from a first sensor downstream of each of an engine, a HP-EGR line, and a turbine, and a second sensor downstream of the first sensor and the SCR device and upstream of the LP-EGR line. A fourth example of the method, optionally including one or more of the first through third examples, further includes where the quantity of ammonia desired during the HP-EGR mode is calculated via estimating an amount of nitric oxides present in an exhaust gas directly downstream of an engine. A fifth example of the method, optionally including one or more of the first through fourth examples, further includes where the quantity of ammonia desired during the HP-EGR mode is model based when LP-EGR is flowing. A sixth example of the method, optionally including one or more of the first through fifth examples, further includes where the quantity of ammonia desired during the HP-EGR mode is calculated via feedback from a sensor downstream of each of an engine, a HP-EGR line, and a turbine when HP-EGR is flowing. A seventh example of the method, optionally including one or more of the first through sixth examples, further includes where the comparison of the first and second differences includes selecting the HP-EGR mode in response to the first difference being greater than 0 and the second difference being greater than 0. An eighth example of the method, optionally including one or more of the first through seventh examples, further includes where the comparison of the first and second differences includes selecting the LP-EGR mode in response to the first difference being less than or equal to 0 and the second difference being less than 0. A ninth example of the method, optionally including one or more of the first through eighth examples, further includes where the second difference is ignored if the second difference is equal to 0.

An embodiment of a system comprises an engine fluidly coupled to an intake tract and an exhaust tract, the exhaust tract comprising a HP-EGR line arranged directly downstream of the engine and a LP-EGR line arranged between first and second SCR devices arranged along the exhaust tract, the HP-EGR line and LP-EGR line shaped to flow exhaust gas to the intake tract, and a controller with computer-readable instructions stored thereon that when executed enable the controller to calculate a first difference between an ammonia desired for an HP-EGR mode and a LP-EGR mode, calculate a second difference between a magnitude of $NO_x$ emission for the HP-EGR mode and the LP-EGR mode, and selecting one of the HP-EGR mode or the LP-EGR mode based on the first and second differences. A first example of the system further comprises where the HP-EGR line is upstream of the first SCR device, a turbine, a first $NO_x$ sensor, and a lean $NO_x$ trap, and where a reductant injector is positioned to inject upstream of the first SCR device and downstream of the lean $NO_x$ trap. A second example of the system, optionally including the first example, further comprises where the ammonia desired is based on at least $NO_x$ emission by the engine, $NO_x$ recirculated from the exhaust tract to the engine, and ammonia recirculated from the exhaust tract to the engine, wherein ammonia is not recirculated in the HP-EGR mode. A third example of the system, optionally including the first and/or second examples, further comprises where the first difference is compared to 0, the HP-EGR mode is selected if the first difference is greater than 0 and the LP-EGR mode is selected if the first difference is less than or equal to 0. A fourth example of the system, optionally including one or more of the first through third examples, further includes where the second difference is compared to 0, the HP-EGR mode is selected if the second difference is greater than 0 and the LP-EGR mode is selected if the second difference is less than 0, wherein the second difference is ignored if it is equal to 0.

An additional embodiment of a system comprising an intake tract fluidly coupled to an engine, an exhaust tract arranged to receive exhaust gas from the engine, the exhaust tract comprising a HP-EGR line and a LP-EGR line, the LP-EGR line arranged downstream of a reductant injector and a first SCR device, the LP-EGR line arranged upstream of a second SCR device, a first $NO_x$ sensor arranged downstream of a turbine and upstream of the reductant injector and a second $NO_x$ sensor arranged downstream of the second SCR device, and a controller with computer-readable instructions stored on non-transitory memory that when executed enable the controller to switch from a HP-EGR mode to a LP-EGR mode in response to a HP-EGR mode ammonia desired being greater than the LP-EGR mode ammonia desired, and switch from the LP-EGR mode to the HP-EGR mode in response to the LP-EGR mode ammonia desired being greater than the HP-EGR mode ammonia desired. A first example of the system further comprises where instructions further enable the controller to switch from a HP-EGR mode to the LP-EGR mode in response to a HP-EGR mode $NO_x$ emission magnitude being greater than a LP-EGR mode $NO_x$ emission magnitude. A second example of the system, optionally including the first example, further comprises where instructions further enable the controller to compare a difference between the HP-EGR mode ammonia desired and the LP-EGR mode ammonia desired to a difference between the HP-EGR mode $NO_x$ emission magnitude and the LP-EGR mode $NO_x$ emission magnitude in response to the HP-EGR mode ammonia desired being less than the LP-EGR mode ammonia desired and the HP-EGR mode $NO_x$ emission magnitude being greater than the LP-EGR mode $NO_x$ emission magnitude. A third example of the system, optionally including the first and/or second examples, further comprises where the HP-EGR mode is selected in response to the difference between the HP-EGR mode ammonia desired and the LP-EGR mode ammonia desired being greater than the difference between the HP-EGR mode $NO_x$ emission magnitude and the LP-EGR mode $NO_x$ emission magnitude. A fourth example of the system, optionally including one or more of the first through fourth examples, further comprises where the LP-EGR mode is selected in response to the difference between the HP-EGR mode ammonia desired and the LP-EGR mode ammonia desired being less than the difference between the HP-EGR mode $NO_x$ emission magnitude and the LP-EGR mode $NO_x$ emission magnitude.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
  determining a first difference between a first quantity of ammonia desired by an SCR device during an LP-EGR mode and a second quantity of ammonia desired by the SCR device during an HP-EGR mode;
  determining a second difference between a first amount of nitric oxide emission during the LP-EGR mode and a second amount of nitric oxide emission during the HP-EGR mode;
  selecting one of the LP-EGR mode and the HP-EGR mode based on a comparison of the first and second differences; and
  flowing LP-EGR to an engine responsive to selecting the LP-EGR mode and flowing HP-EGR to the engine responsive to selecting the HP-EGR mode, the engine fluidly coupled to the SCR device.

2. The method of claim 1, wherein the first quantity of ammonia desired during the LP-EGR mode is calculated via estimating an amount of nitric oxide generated by the engine and an amount of ammonia recirculated through an LP-EGR line to the engine.

3. The method of claim 2, wherein the first quantity of ammonia desired during the LP-EGR mode is model-based when HP-EGR is flowing.

4. The method of claim 2, wherein the first quantity of ammonia desired is calculated when LP-EGR is flowing via feedback from a first sensor downstream of the engine, a HP-EGR line, and a turbine with respect to a direction of exhaust gas flow, and a second sensor downstream of the first sensor and further downstream of the SCR device and upstream of the LP-EGR line.

5. The method of claim 1, wherein the second quantity of ammonia desired during the HP-EGR mode is calculated via estimating an amount of nitric oxides present in an exhaust gas directly downstream of the engine.

6. The method of claim 5, wherein the second quantity of ammonia desired during the HP-EGR mode is model based when LP-EGR is flowing.

7. The method of claim 5, wherein the second quantity of ammonia desired during the HP-EGR mode is calculated when HP-EGR is flowing via feedback from a sensor downstream of the engine, an HP-EGR line, and a turbine with respect to a direction of exhaust gas flow.

8. The method of claim 1, wherein the comparison of the first and second differences includes selecting the HP-EGR mode in response to the first difference being greater than 0 and the second difference being greater than 0.

9. The method of claim 1, wherein the comparison of the first and second differences includes selecting the LP-EGR mode in response to the first difference being less than or equal to 0 and the second difference being less than 0.

10. The method of claim 1, wherein the second difference is ignored if the second difference is equal to 0.

11. A system comprising:
  an engine fluidly coupled to an intake tract and an exhaust tract, the exhaust tract comprising an HP-EGR line arranged directly downstream of the engine and an LP-EGR line arranged between a first SCR device and a second SCR device arranged along the exhaust tract, the HP-EGR line and the LP-EGR line shaped to flow exhaust gas to the intake tract; and
  a controller with computer-readable instructions stored thereon that when executed enable the controller to:
    calculate a first difference between a first amount of ammonia desired for an HP-EGR mode and a second amount of ammonia desired for an LP-EGR mode;

calculate a second difference between a first magnitude of $NO_x$ emission for the HP-EGR mode and a second magnitude of NOx emission for the the LP-EGR mode;

select one of the HP-EGR mode or the LP-EGR mode based on the first and second differences; and flow exhaust gas to the intake tract via the HP-EGR line when the HP-EGR mode is selected and flow exhaust gas to the intake tract via the LP-EGR line when the LP-EGR mode is selected.

12. The system of claim 11, wherein the HP-EGR line is upstream of the first SCR device, a turbine, a first $NO_x$ sensor, and a lean $NO_x$ trap, and where a reductant injector is positioned to inject reductant upstream of the first SCR device and downstream of the lean $NO_x$ trap.

13. The system of claim 12, wherein each of the first and second amounts of ammonia desired is based on at least $NO_x$ emission by the engine, $NO_x$ recirculated from the exhaust tract to the engine, and ammonia recirculated from the exhaust tract to the engine, wherein ammonia is not recirculated in the HP-EGR mode.

14. The system of claim 11, wherein the first difference is compared to 0, the HP-EGR mode is selected if the first difference is greater than 0 and the LP-EGR mode is selected if the first difference is less than or equal to 0.

15. The system of claim 14, wherein the second difference is compared to 0, the HP-EGR mode is selected if the second difference is greater than 0 and the LP-EGR mode is selected if the second difference is less than 0, wherein the second difference is ignored if it is equal to 0.

16. A system comprising:
an intake tract fluidly coupled to an engine;
an exhaust tract arranged to receive exhaust gas from the engine, the exhaust tract comprising an HP-EGR line and an LP-EGR line, the LP-EGR line arranged downstream of a reductant injector and a first SCR device, the LP-EGR line arranged upstream of a second SCR device;
a first $NO_x$ sensor arranged downstream of a turbine and upstream of the reductant injector and a second $NO_x$ sensor arranged downstream of the second SCR device; and
a controller with computer-readable instructions stored on non-transitory memory that when executed enable the controller to:

operate in an HP-EGR mode that includes a first valve in the HP-EGR line being open and a second valve in the LP-EGR line being closed so that HP-EGR flows to the intake tract;

switch from operating in the HP-EGR mode to operating in an LP-EGR mode in response to an HP-EGR mode ammonia desired being greater than an LP-EGR mode ammonia desired, where operating in the LP-EGR mode includes closing the first valve and opening the second valve so that LP-EGR flows to the intake tract; and switch from operating in the LP-EGR mode to operating in the HP-EGR mode in response to the LP-EGR mode ammonia desired being greater than the HP-EGR mode ammonia desired.

17. The system of claim 16, wherein instructions are further executable to switch from the HP-EGR mode to the LP-EGR mode in response to an HP-EGR mode $NO_x$ emission magnitude being greater than an LP-EGR mode $NO_x$ emission magnitude.

18. The system of claim 17, wherein instructions are further executable to compare a difference between the HP-EGR mode ammonia desired and the LP-EGR mode ammonia desired to a difference between the HP-EGR mode $NO_x$ emission magnitude and the LP-EGR mode $NO_x$ emission magnitude in response to the HP-EGR mode ammonia desired being less than the LP-EGR mode ammonia desired and the HP-EGR mode $NO_x$ emission magnitude being greater than the LP-EGR mode $NO_x$ emission magnitude.

19. The system of claim 18, wherein the HP-EGR mode is selected in response to the difference between the HP-EGR mode ammonia desired and the LP-EGR mode ammonia desired being greater than the difference between the HP-EGR mode $NO_x$ emission magnitude and the LP-EGR mode $NO_x$ emission magnitude.

20. The system of claim 18, wherein the LP-EGR mode is selected in response to the difference between the HP-EGR mode ammonia desired and the LP-EGR mode ammonia desired being less than the difference between the HP-EGR mode $NO_x$ emission magnitude and the LP-EGR mode $NO_x$ emission magnitude.

* * * * *